US007226034B2

(12) United States Patent
Stark et al.

(10) Patent No.: US 7,226,034 B2
(45) Date of Patent: Jun. 5, 2007

(54) SOLENOID VALVE ACTUATOR

(75) Inventors: Mark H. Stark, St. Louis, MO (US); Donald L. Blessing, St. Louis, MO (US); Mike C. Santinanavat, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/236,767

(22) Filed: Sep. 27, 2005

(65) Prior Publication Data
US 2007/0069167 A1    Mar. 29, 2007

(51) Int. Cl.
*F16K 31/02* (2006.01)

(52) U.S. Cl. ............... 251/76; 251/129.19; 251/129.2; 251/242

(58) Field of Classification Search ............ 251/76, 251/129.19, 129.2, 231, 236, 242
See application file for complete search history.

(56) References Cited

U.S. PATENT DOCUMENTS

| 2,051,938 | A | * | 8/1936 | Carlson | 251/76 |
| 2,155,358 | A | * | 4/1939 | Cyr | 251/76 |
| 2,175,902 | A | * | 10/1939 | Korndorfer | 251/76 |
| 2,570,450 | A | * | 10/1951 | Hottenroth | 251/129.2 |
| 3,603,559 | A | * | 9/1971 | Totten | 251/129.2 |
| 3,683,962 | A | * | 8/1972 | Good | 251/129.2 |
| 4,044,652 | A | * | 8/1977 | Lewis et al. | 91/368 |
| 4,268,009 | A | * | 5/1981 | Allen, Jr. | 251/129.2 |
| 4,527,590 | A | * | 7/1985 | Kolze | 251/129.19 |
| 4,840,193 | A | * | 6/1989 | Schiel | 251/129.2 |
| 6,302,143 | B1 | | 10/2001 | Sarlak | 137/505.14 |

* cited by examiner

*Primary Examiner*—John Bastianelli
(74) *Attorney, Agent, or Firm*—Harness, Dickey & Pierce, P.L.C.

(57) ABSTRACT

A solenoid operated valve is provided that comprises an inlet, an outlet, a valve seat in the flow path between the inlet and the outlet, and a valve member slidably mounted for movement in a direction aligned with but perpendicular to the plane of the valve seat, and a lever having one end in connection with the valve member and a pivotal end that is operable for moving the valve member between its closed and open positions. The solenoid operated valve further comprises a solenoid actuated member having spaced apart first and second surfaces for engaging the pivotal end of the lever to move the valve member between its closed and open position, and a spring for resiliently biasing the solenoid actuated member so that the first surface engages the pivotal end of the lever to move the valve member to a closed position against the valve seat when the solenoid is not energized.

20 Claims, 4 Drawing Sheets

SOLENOID VALVE ACTUATOR

FIELD OF THE INVENTION

This invention relates to solenoid operated valves, and more particularly to valve actuation mechanisms for opening and closing a valve.

BACKGROUND OF THE INVENTION

Solenoid actuators are commonly used to control the flow of fluids through a valve, and may be electrically actuated. Various references have disclosed solenoid valve designs in which a moveable member is in engagement with a valve, and operates the valve between an open and a closed position. However, the operation of such valve designs in high capacity fluid flow applications is compromised, because of the fluid pressure against a large valve required for high capacity flow hinders opening of the valve. Also, the typical valve design is such that the valve must be biased closed by the inlet pressure.

SUMMARY OF THE INVENTION

In one embodiment, a solenoid operated valve in accordance with the principles of the present invention is provided that comprises an inlet, an outlet, a valve seat in the flow path between the inlet and the outlet, and a valve member slidably mounted for movement in a direction aligned with but perpendicular to the plane of the valve seat, and a lever having one end in connection with the valve member and a pivotal end that is operable for moving the valve member between its closed and open positions. The solenoid operated valve further comprises a solenoid actuated member having spaced apart first and second surfaces for engaging the pivotal end of the lever to move the valve member between its closed and open position, and a spring for resiliently biasing the solenoid actuated member so that the first surface engages the pivotal end of the lever to move the valve member to a closed position against the valve seat when the solenoid is not energized. Energizing the solenoid initiates movement of the solenoid actuated member, such that the first surface disengages from the pivotal end of the lever and momentum is generated before the second surface of the solenoid actuated member engages the pivotal end of the lever to move the valve member to an open position.

In accordance with one aspect of the present invention, various embodiments of a solenoid operated valve are provided that may be energized to establish movement of the solenoid actuated member before the second surface of the solenoid actuated member engages the pivotal end of the lever. The solenoid actuated member accordingly provides an impact force sufficient to overcome the inlet pressure against the valve element to move the valve element away from the valve seat to an open position.

In accordance with another aspect of the present invention, some embodiments may further comprise a second spring for biasing the valve member towards an open position. Upon energizing the solenoid and separation of the valve member from the valve seat, the second spring biases the pivotal end of the lever against the first surface of the solenoid actuated member to hold the valve member in an open position while the solenoid is energized.

Further aspects of the present invention will become apparent from the detailed description provided hereinafter. It should be understood that the detailed description and specific examples, while indicating various embodiments and methods of the invention, are for illustration purposes only and are not intended to limit the scope of the invention.

BRIEF DESCRIPTION OF THE DRAWINGS

Corresponding reference numerals indicate corresponding parts throughout the several views of the drawings.

DETAILED DESCRIPTION OF THE EMBODIMENTS

Figure 1:
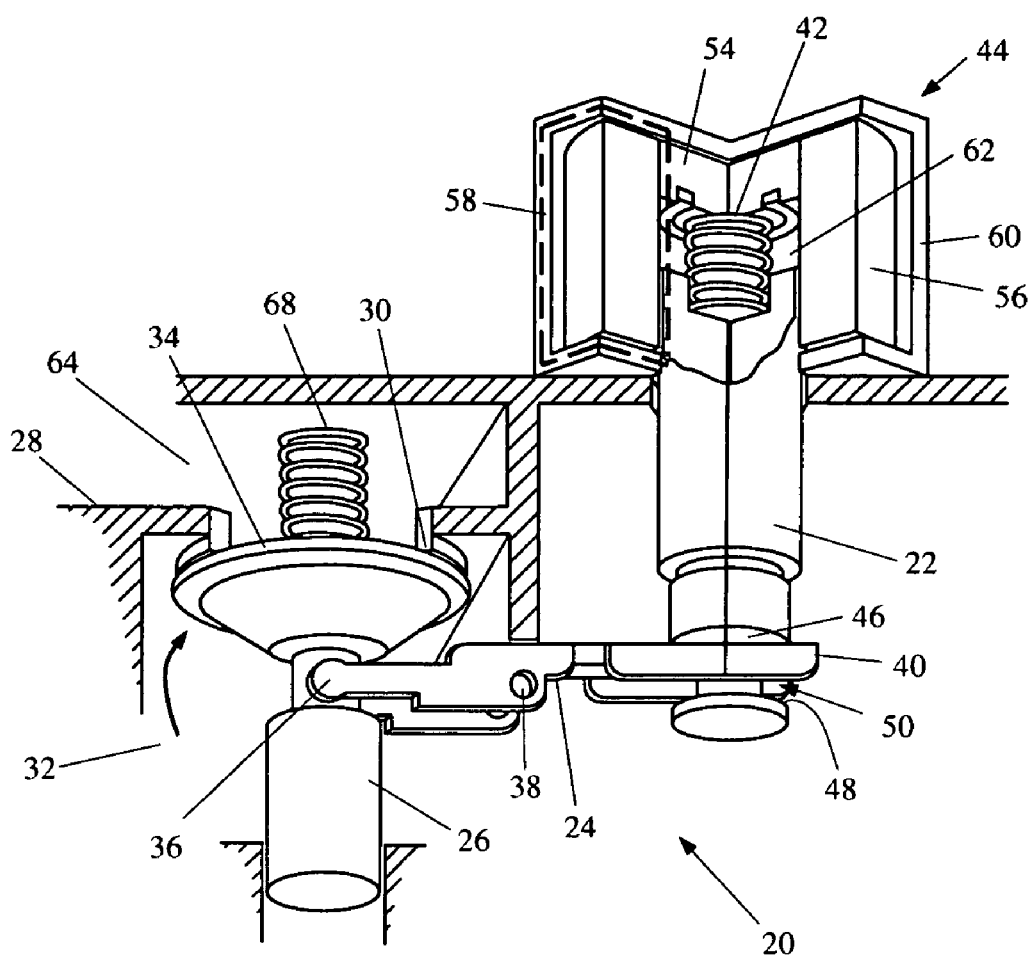
FIG. 1 is a cross-sectional perspective view of one embodiment of a solenoid operated valve in a closed position, in accordance with the principles of the present invention.
Figure 2:
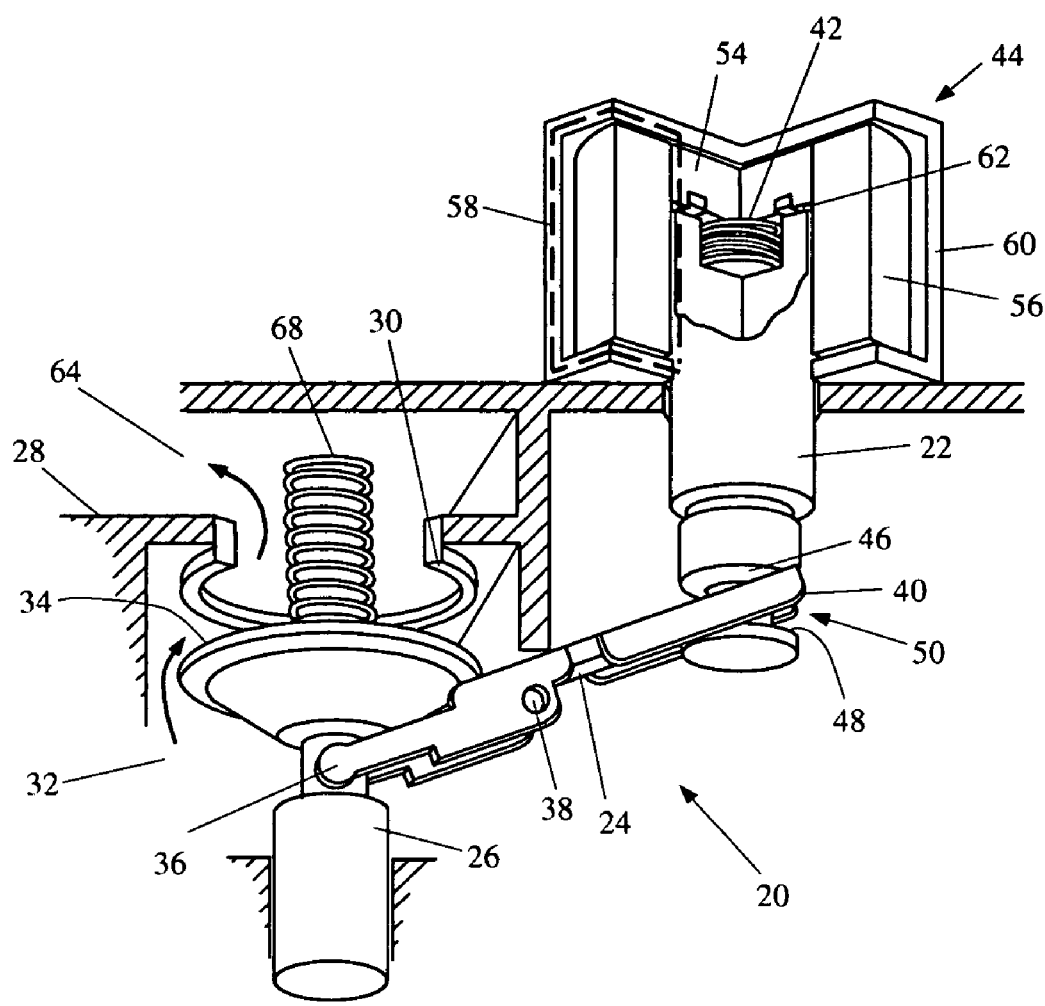
FIG. 2 is a cross-sectional perspective view of one embodiment of a solenoid operated valve in an open position.

One embodiment of a solenoid valve assembly in accordance with the principles of the present invention is indicated generally as 20 in FIG. 1, and comprises a moveable member 22 for engaging a pivoting lever 24 for moving a valve member 26 between a closed and an open position. The solenoid valve assembly 20 comprises a valve casing or housing 28 having an inlet, an outlet, and a valve seat 30 in the flow path between the inlet and the outlet. A valve member 26 is disposed within a chamber 32 on the inlet side of the valve seat 30, and is slidably mounted to provide for movement in a direction with but perpendicular to the valve seat 30. The valve member 26 is movable between an open position and a closed position against the valve seat 30. The valve member 26 may further comprise a resilient valve element 34 secured to the end of the valve member 26 as shown in FIG. 2, to sealingly engage the surface of the valve seat 30. It should be noted that in some embodiments, the valve member 26 and valve element 34 may be integrally formed into one valve member for closing against the valve seat 30. The valve member 26 is in connection with one end of a pivoting lever 24, which has a pair of arms forming clevis-like pivot joint 36 on its end for establishing a point of contact with the valve member 26. The point of contact shown in FIGS. 1 and 2 comprises a pivotal connection with the valve member 26, which may be provided by a pivot pin extending through the valve member 26. Alternatively, the pivotal connection may be provided by a dimple or formed protrusion on the inner side of each of the clevis-like arms of the pivoting lever 24, which protrusions may be received within a pair of recesses on opposing sides of the valve member 26. The pivoting lever 24 further comprises a pivot pin 38 at its fulcrum, about which the lever rotates. The end of the pivoting lever 24 opposite the connection with the valve member 26 comprises a pivotal end 40. The pivotal end 40 of the lever 24 is operable to establish a pivoting action of the lever 24 that permits movement of the valve member 26 between an open position and a closed position against the valve seat 30.

Figure 4:
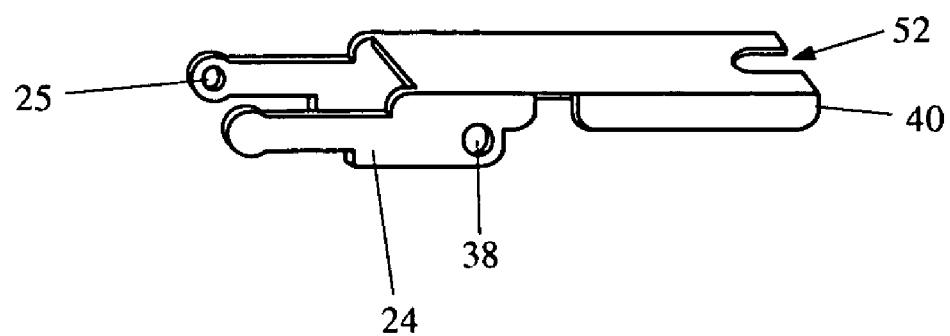
FIG. 4 is a perspective view of a pivoting lever in accordance with the principles of the present invention.

The solenoid operated valve further comprises a movable member 22, which when the solenoid is energized moves to engage the lever 24 to move the valve member 26 to an open position away from the valve seat 30. A first spring 42 is also provided for biasing the movable solenoid actuated member 22 against the lever 24 for moving the lever 24 and the valve member 26 to a closed position against the valve seat 30. Specifically, the movable solenoid actuated member 22 is slidably disposed within the solenoid 44, and has first and second spaced apart surfaces for engaging the pivotal end of the lever 24 to move the valve member 26 between its closed and open positions. In the first embodiment, the first and second spaced apart surfaces of the solenoid actuated member 22 are first and second shoulders 46 and 48 formed by an annular groove near one end of the solenoid actuated member 22. In other embodiments of the invention, the first and second spaced apart surfaces may alternately comprise protruding tabs for engaging the pivotal end of the lever 24. The first shoulder surface 46 and the second shoulder surface 48 are spaced apart from each other by a spacing 50, which provides for alternately engaging the lever 24. The lever 24 preferably comprises a slotted portion 52 as shown in FIG. 4, wherein the slotted portion 52 fits around the solenoid actuated member 22, and provides for engaging the first and second shoulders 46 and 48.

When the solenoid 44 is not energized, the valve member 26 is normally in a closed position against the valve seat 30 as shown in FIG. 1. The spring 42 biases the solenoid actuated member 22 against the lever 24 and away from a stop 54 in the solenoid 44. Specifically, the spring 42 moves the lever 24 and the valve member 26 towards a closed position, in which the first shoulder surface 46 of the solenoid actuated member 22 is engaged with the pivotal end of the lever 24. Thus, the spring 42 provides a closing force for holding the movable member 22, the pivoting lever 24, and the valve member 26 in the closed position. In addition to this force, the pressure of the fluid in the inlet chamber 32 can also provide a considerable force against the valve member 26 that holds the valve member 26 in a closed position against the valve seat 30. For example, where the valve assembly of the present invention is used to control LP or Natural Gas flow through a large valve seat opening required for high capacity applications of up to 400,000 BTU, a rated inlet pressure of 14 PSIG can produce considerable force against the valve member 26. Thus, the solenoid would need to overcome both the force of the biasing spring 42 and the inlet pressure against the valve member 26 to open the valve.

Figure 3:
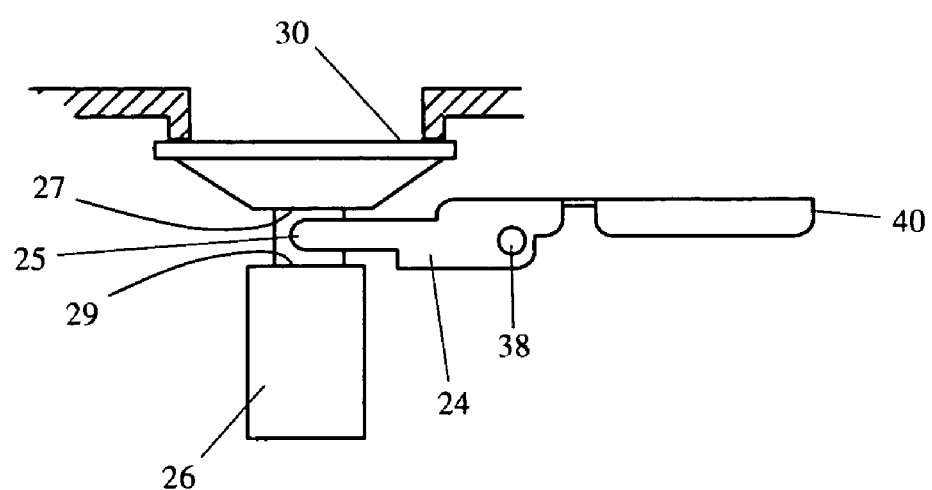
FIG. 3 is a side elevation view of a pivoting lever and valve member in another embodiment of a solenoid operated valve in accordance with the principles of the present invention.

To energize the solenoid 44, a predetermined voltage is applied to the solenoid coil 56, to actuated the solenoid 44. The actuating voltage applied the coil 56 generates ampere-turns or magneto-motive force that is established in a magnetic circuit 58 in the solenoid valve consisting of a ferromagnetic structure 60 and a working air gap 62. Because such solenoid coils comprising a copper wire wound around a bobbin a predetermined number of turns are prevalently used and are well known in the art, the coil 56 will not be described in detail. The energizing of the solenoid coil 56 provides a force for moving the magnetically responsive moveable member 22 against the force of the biasing spring 42 and towards the stationary stop 54 to close the working air gap 62 as shown in FIG. 3. Upon energizing the solenoid 44, the solenoid initiates movement of the solenoid actuated member 22 so that the first shoulder surface 46 disengages from the pivotal end of the lever 24. The movable member 22 will begin to generate momentum before the second shoulder surface 48 of the solenoid actuated member 22 engages the pivotal end of the lever 24 to move the valve member to an open position as shown in FIG. 3. The momentum of the solenoid actuated member 22 imparts an impact force against the pivotal end of the lever 24 that is sufficient to overcome the pressure that is holding the valve member 26 against the valve seat 30 in a closed position. This momentum established by the velocity and mass of the solenoid actuated member 22 is used to provide an impact force that is applied by the second shoulder surface 48 to the pivotal end of the lever 24 to the valve member 26. The valve member 26 is able to open against the inlet pressure by virtue of the momentum of the solenoid actuated member 22, which will continue to move until it is seated against the stop 54 in the solenoid 44. After the valve member 26 opens, the inlet pressure in the chamber 32 will drop as a result of the fluid flow through the valve seat opening 30 towards the chamber 64 leading to the valve outlet. Once the valve member 26 has separated from the valve seat 30 and the inlet pressure has dropped, a second spring 68 that biases the valve member 26 towards an open position moves the valve member 26 and the lever 24 so that the pivotal end of the lever 24 is engaging the first shoulder 46 of the solenoid actuated member 22. The first embodiment of the solenoid operated valve will then remain in an open position shown in FIG. 2 as long as the solenoid remains energized.

When the voltage to the solenoid coil 56 is removed or significantly reduced, the solenoid 44 is de-energized. Upon de-energizing the solenoid 44, the biasing spring 42 will provides a closing force for returning the movable member 22, the pivoting lever 24, and the valve member 26 to a closed position, in which the valve member 26 and the valve element 34 are sealingly engaged with the valve seat 30. In this embodiment, the valve element 34 may be made of a lightweight fluorinated hydrocarbon polymer, or other polymeric or resilient sealing material, or a combination of different materials bonded together. The valve element 34 sealingly engages the valve seat 30 in a closed position when the solenoid is not actuated. The initial movement of the moveable member 22 allows the lever 24 to provide an impact force against the valve member 26 to assist in moving the valve member 26 against the inlet pressure and away from the sealed position against the valve seat 30 to an open position. Testing of one preferred embodiment of a solenoid valve incorporating the principles of the present invention has successfully controlled high capacity flow of fluids up to 400 cubic feet per hour with an inlet pressure of about 14 inches of water column. Thus, the present invention to provide an economical robust valve design that can operate in high capacity fluid flow applications involving a substantial inlet pressures.

In a second embodiment, a pivoting lever 24 is provided as shown in FIG. 3 that comprises a pair of arms 25 forming a clevis-like extension for establishing a point of contact between the pivoting lever 24 and the valve member 24. The arms of the pivoting lever are not secured directly to the valve member 24, but rather are received between two shoulder surfaces 27 and 29 of the valve member 26 such that the pivoting lever arms may engage one or the other shoulder surface 27 and 29 on the valve member 26 to move the valve member 26 towards or away from the valve seat. When the solenoid valve moveable member 22 is in a de-energized state, the pivoting lever is biased by spring 42 (as shown in FIG. 1) to pivot about fulcrum 38 and engage the upper shoulder surface 27 on the valve member 26 to hold the valve member 26 in a closed position against the valve seat 30. When the solenoid valve moveable member 22 is energized, the moveable member 22 engages the pivoting lever 24 and causes the arms of the pivoting lever 24 to impact against the lower shoulder surface 29 on the valve member 26 to force the valve member away from the valve seat. Accordingly, the pivoting lever 26 of this second embodiment also provides an opening impact force for enabling the valve member 26 to open against an inlet pressure by virtue of the momentum of the solenoid actuated member 22 engaging the pivoting lever 26 which in turn impacts the valve member 26.

The advantages of the above described embodiment and improvements should be readily apparent to one skilled in the art, as to enabling a resilient, high cycling solenoid valve for fluid control. Additional design considerations, such as the control of the application of voltage to the solenoid coil 56, may be incorporated without departing from the spirit and scope of the invention. Accordingly, it is not intended that the invention be limited by the particular embodiment or form described above, but by the appended claims.

What is claimed is:

1. A solenoid operated valve comprising:
    an inlet;
    an outlet;
    a valve seat in the flow path between the inlet and the outlet;
    a valve member slidably mounted for movement in a direction aligned with, but perpendicular to the plane of the valve seat;
    a lever having one end pivotally connected with the valve member and a pivotal end that is operable for moving the valve member between its closed and open positions;
    a solenoid actuated member having first and second surfaces for engaging the pivotal end of the lever to move the valve member between its closed and open position, the first and second surfaces being separated by a spacing such that the first and second surfaces alternately engage the lever, wherein the spacing is sufficient to enable the solenoid actuated member to establish momentum between disengagement by the first surface with the lever and engagement by the second surface with the lever, wherein when the valve member is closed said momentum provides an impact force directly to the lever and indirectly to the valve member, which impact force is effective to overcome the pressure holding the valve member closed against the valve seat and cause the valve member to open; and
    a spring for resiliently biasing the solenoid actuated member so that the first surface engages the pivotal end of the lever to move the valve member to a closed position against the valve seat when the solenoid is not energized, wherein energizing the solenoid initiates movement of the solenoid actuated member so that the first surface disengages from the pivotal end of the lever and momentum is generated before the second surface of the solenoid actuated member engages the pivotal end of the lever to move the valve member to an open position.

2. The solenoid operated valve of claim 1 wherein the momentum of the solenoid actuated member imparts an impact force against the pivotal end of the lever sufficient to overcome the pressure holding the valve member closed against the valve seat.

3. The solenoid operated valve of claim 2 further comprising a second spring for biasing the valve member towards an open position, where upon energizing the solenoid and separation of the valve member from the valve seat, the second spring biases the pivotal end of the lever against the first surface of the solenoid actuated member to hold the valve member in an open position while the solenoid is energized.

4. The solenoid operated valve of claim 1, wherein energizing the solenoid establishes movement of the solenoid actuated member before the second surface of the solenoid actuated member engages the pivotal end of the lever, to provide an impact for moving the valve element away from the valve seat to an open position.

5. The solenoid operated valve of claim 4, whereupon de-energizing the solenoid, the first biasing spring moves the solenoid actuated member and the pivotal end of the lever to cause the valve member to close against the valve seat.

6. The solenoid operated valve of claim 5, whereupon the valve member closing against the valve seat, the first spring biases the solenoid actuated member to hold the first surface of the solenoid actuated member in engagement with the pivotal end of the lever, such that the valve member remains closed against the valve seat while the solenoid is not energized.

7. The solenoid operated valve of claim 6, wherein the first and second surfaces of the solenoid actuated member are first and second shoulders formed by an annular groove near one end of the solenoid actuated member.

8. The solenoid operated valve of claim 7 wherein the pivotal end of the lever comprises a slotted end for engaging the first and second shoulders of the solenoid actuated member.

9. In a solenoid actuated valve of the type having an inlet, an outlet, and a valve seat in the flow path between the inlet and the outlet, a valve member resiliently biased toward a closed position against the valve seat, and a solenoid for effecting movement of the valve member against the resilient bias to open the valve, the improvement comprising:
    a pivoting member in connection with the valve member to provide for moving the valve member between an open position and a closed against the valve seat;
    a valve element on the valve member for sealingly engaging the valve seat when in the closed position;
    a solenoid for moving a movable member towards the pivoting member when the solenoid is energized, the movable member having first and second surfaces being separated by a spacing such that the first and second surfaces alternately engage the pivoting member, wherein the spacing is sufficient to enable the solenoid actuated member to establish momentum between disengagement by the first surface with the pivoting member and engagement by the second surface with the pivoting member, wherein when the valve member is closed said momentum provides an impact force directly to the lever and indirectly to the valve member, which impact force is effective to overcome the pressure holding the valve member closed against the valve seat and move the pivoting member and the valve member to an open position away from the valve seat.

10. The solenoid actuated valve of claim 9, wherein the momentum of the moveable member imparts an impact force against the pivoting member sufficient to overcome the biasing forces holding the valve element closed against the valve seat.

11. The solenoid actuated valve of claim 10 further comprising a first biasing means for biasing the movable member against the pivoting member to move the valve member to a closed position when the solenoid is not energized.

12. The solenoid actuated valve of claim 11, further comprising a second biasing means for biasing the valve member towards an open position, where upon energizing the solenoid and opening of the valve, the second spring biases the valve member against the movable member to hold the valve member in an open position while the solenoid is energized.

13. The solenoid actuated valve of claim 12, wherein the solenoid actuation establishes movement of the moveable member before the moveable member engages the pivoting member in connection with the valve element, to provide an impact for moving the valve element away from the valve seat to an open position.

14. The solenoid actuated valve of claim 13 where the connection of the lever with the valve member comprises a clevis on the end of the lever and a pivot pin through the clevis and valve member.

15. A solenoid-actuated valve comprising:
a valve housing having an inlet and an outlet;
a valve seat in the flow path between the inlet and outlet;
a valve member movable relative to the valve seat;
a pivoting member in connection with the valve member;
a solenoid-actuated member for engaging the pivoting member to move the valve member away from the valve seat to an open position, wherein energizing the solenoid initiates movement of the solenoid actuated member, which includes first and second surfaces separated by a spacing such that the first and second surfaces alternately engage the pivoting member, wherein the spacing enables the solenoid actuated member to establish momentum between disengagement by the first surface with the pivoting member and engagement by the second surface with the Pivoting member, wherein when the valve member is in a closed position the spacing between the second surface of the solenoid actuated member and the lever is sufficient to establish sufficient momentum for providing an impact force directly to the pivoting member and indirectly to the valve member, which impact force is effective to overcome the force holding the valve member closed against the valve seat and move the pivoting member and the valve member to an open position away from the valve seat; and
a spring for biasing the moveable member against the pivoting member to move the valve member to a closed position against the valve seat when the solenoid is not energized.

16. The solenoid actuated valve of claim 15, wherein the momentum of the solenoid actuated member imparts an impact force against the pivoting member sufficient to overcome the pressure holding the valve member closed against the valve seat.

17. The solenoid-actuated valve of claim 16, wherein the solenoid actuation establishes movement of the moveable member before the moveable member engages the pivoting member engaged with the valve member, to provide an impact for moving the valve member away from the valve seat to an open position.

18. The solenoid-actuated valve of claim 17, whereupon de-energizing the solenoid, the first biasing springs moves the moveable member and the pivoting member to cause the valve member to sealingly engage the valve seat.

19. The solenoid actuated valve of claim 18, further comprising a second biasing means for biasing the valve member towards an open position.

20. The solenoid actuated valve of claim 19, wherein the second spring biases the valve member and the pivoting member against the movable member to hold the valve member in an open position while the solenoid is energized.

* * * * *